United States Patent
Jin et al.

(10) Patent No.: US 10,429,634 B2
(45) Date of Patent: Oct. 1, 2019

(54) THERMAL DRIVEN MEMS TUNABLE FILTER

(71) Applicant: Agiltron, Inc., Woburn, MA (US)

(72) Inventors: Guanghai Jin, Chelmsford, MA (US); Congshun Wang, Woburn, MA (US); Jing Zhao, Woburn, MA (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 15/830,834

(22) Filed: Dec. 4, 2017

(65) Prior Publication Data

US 2019/0171001 A1 Jun. 6, 2019

(51) Int. Cl.
*G02B 26/00* (2006.01)
*G01J 3/26* (2006.01)
*G02B 6/293* (2006.01)

(52) U.S. Cl.
CPC ............. *G02B 26/001* (2013.01); *G01J 3/26* (2013.01); *G02B 6/29361* (2013.01); *G02B 6/2938* (2013.01)

(58) Field of Classification Search
CPC .............. G02B 5/284; G02B 6/29361; G01J 3/26–2003/267; G01B 2290/25; H01S 3/08036; G09G 3/3466
See application file for complete search history.

(56) References Cited

U.S. PATENT DOCUMENTS

| | | | | |
|---|---|---|---|---|
| 3,466,565 A | * | 9/1969 | Rigrod | H01S 3/08036 359/246 |
| 4,048,627 A | * | 9/1977 | Ettenberg | H01L 33/145 257/96 |
| 6,420,695 B1 | * | 7/2002 | Grasdepot | G01J 3/26 250/226 |
| 6,674,562 B1 | * | 1/2004 | Miles | B82Y 20/00 216/24 |
| 7,092,162 B1 | * | 8/2006 | Hsieh | G02B 5/284 356/519 |
| 2003/0053078 A1 | * | 3/2003 | Missey | G01J 3/26 356/519 |
| 2004/0151216 A1 | * | 8/2004 | Tsai | H01S 3/1392 372/20 |
| 2005/0074206 A1 | * | 4/2005 | Domash | G02B 6/29358 385/27 |
| 2005/0226281 A1 | * | 10/2005 | Faraone | G02B 26/001 372/20 |
| 2007/0268493 A1 | * | 11/2007 | Kamihara | A61B 1/043 356/456 |
| 2015/0204899 A1 | * | 7/2015 | Salit | G01P 15/093 73/514.26 |

* cited by examiner

*Primary Examiner* — Michael P LaPage
(74) *Attorney, Agent, or Firm* — Shifrin Patent Law; Dan Shifrin

(57) ABSTRACT

A microelectrical mechanical system (MEMS) implementation of tunable Fabry Perot filter devices is disclosed. The advantages associated with the use of these tunable etalons include increases in aperture size, displacement, reliability, and a reduction in cost. In some examples, integrated tunable detectors in miniature spectrometers using a thermal driven MEMS Fabry-Perot tunable filter are provided. Other examples use integrated thermal driven tunable MEMS Fabry-Perot filter to select fiber optical communication channel.

15 Claims, 4 Drawing Sheets

THERMAL DRIVEN MEMS TUNABLE FILTER

TECHNICAL FIELD

The present invention relates generally to optical filters and, in particular, to tunable optical filters.

BACKGROUND ART

Optical spectroscopy systems and wavelength division multiplexing (WDM) communication all rely on using spectrally dispersive element to direct optical signal corresponding to its wavelength. A most common practice is to spatially disperse signal using a grating, and then detected by an array of detectors. The use of the grating, however, requires system tradeoffs between sensitivity and resolution. This because the grating spectral resolution requires the use of a light blocking aperture that reduces the signal intensity. Moreover, a grating based spectrometer is large in size and not suitable for handheld instruments such as cell phones. Another approach widely used in telecommunication is the use of discrete thin film filters in combination with optical switches to achieve WDM channel selection. One drawback of this approach is the high cost that has prevented wide adoption at user terminals or in data centers with large amount of fiber connection nodes.

The incorporation of Fabry-Perot optical filters with microelectromechanical systems (MEMS) technology has enabled the realization of miniaturized optical systems for spectral filtering applications, including wavelength division multiplexing in fiber optical communications, hyperspectral imaging, and gas sensing spectroscopy. MEMS devices are compatible with semiconductor batch processes that precisely produce optical devices in large quantity at low cost. Fabry-Perot filters are composed of two parallel mirrors separated by an optical cavity. The light transmitted through such a filter is maximized at wavelengths of light that interfere constructively within the cavity between the mirrors. By altering the separation between the mirrors, the chosen order can be swept over a range of wavelengths, realizing a tunable optical filter. For spectroscopy applications relatively large apertures, a large tunable wavelength range and narrow line widths are required to directly place the filter in front of a detector. A number of MEMS-based Fabry-Perot filters have been fabricated for use in these applications, with most of these filters using electrostatic actuators to control the position of the movable mirror. To tune over a large wavelength range, the actuator must move the mirror over a relatively large distance. With electrostatic actuators, this is problematic. Electrostatic actuators are based on attraction between two oppositely charged surfaces that are separated by a tiny gap. To move a heavy load of an optical quality mirror of relatively large size, the actuator device must be operated under high electrical fields due to the weak force nature associated with electrostatics. Consequently, the system is nonlinear, with instability of the pull-in, thus intrinsically prone to failures including stick, wear, dielectric changing, and breakdowns. Moreover, the electrostatic device is also sensitive to moisture and requires expensive hermetic sealing. Additionally, the device has charge building-up induced long term drift problem. These deficiencies have prevented the wide use of MEMS based tunable optical filters.

SUMMARY OF THE INVENTION

The disclosed inventive configuration provides a notched beam thermal actuator that overcomes the above deficiencies. It enables the formation of a high quality optical cavity of relative large aperture size as well as extends the travel range of mirrors in Fabry-Perot filters.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

In many optical applications, it is desirable to use a tunable optical filter, such as an etalon, to modulate the intensity of narrow-band light. A tunable optical filter, which is a bandpass filter, is typically made up of two partially reflective mirrors or surfaces separated by a gap to form a cavity. Devices with this structure are called etalons or Fabry-Perot filter. The spectral characteristics of a tunable optical filter are generally determined by the reflectivity and gap spacing (cavity length) of the mirrors or surfaces. Varying the effective cavity length of the device tunes the center wavelength of the spectral bandpass of the etalon. The effective cavity length may be varied by altering the actual physical gap size.

Figure 1:
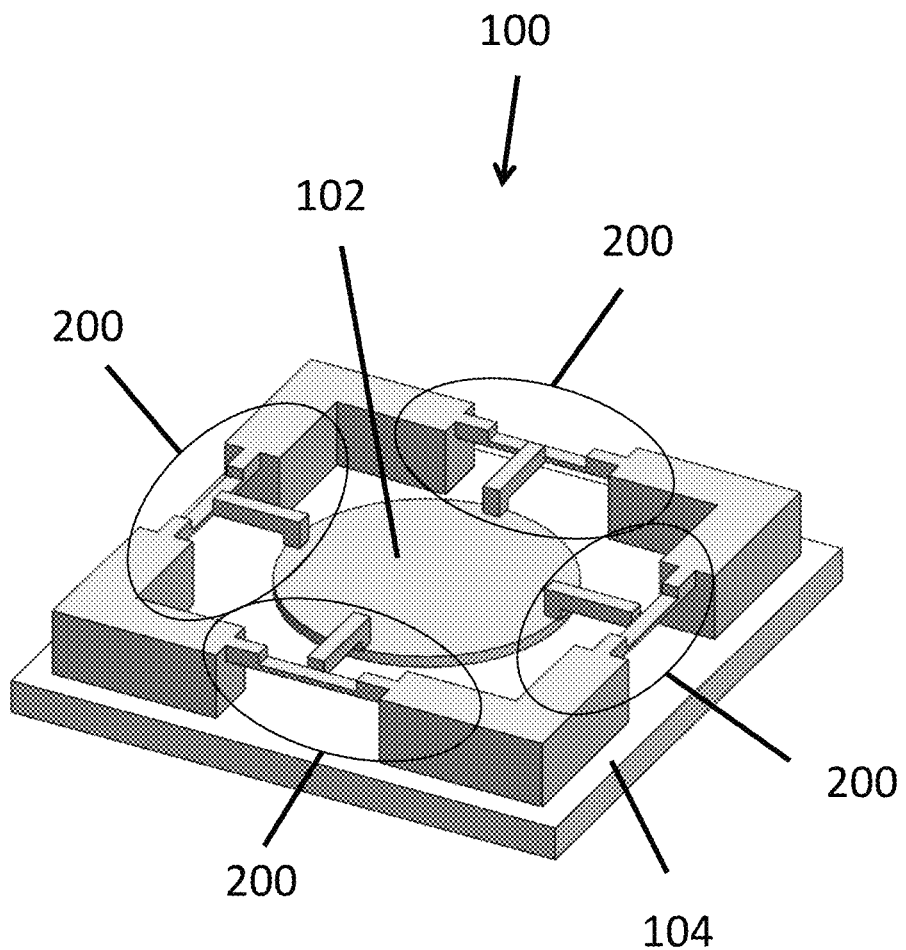
FIG. 1. illustrates an embodiment of an embodiment of an integrated tunable etalon filter according to the present invention.

FIG. 1 illustrates an embodiment of a tunable Fabry-Perot optical filter 100 which has been constructed according to the principles of the present invention. The filter 100 includes multiple (such as four) equally spaced thermal actuators 200 secured to a substrate 104 and configured to move an optical quality mirror 102 up and down relative to a substrate mirror (not shown in FIG. 1). FIG. 2 illustrates a more detailed view of one of the actuators 200. Each actuator 200 comprises an electrically conducting silicon beam 202 having a notch section 202A that is in the center of the beam 202 and is thinner than the end sections 202B of the beam. The beam 202 is fixed to the substrate 104 at both ends 202B by two connecting support posts 204. Electrical leads 206A, 206B are attached to the posts 4 204. A bridge or tether 208 connects the notch section 202A of the actuation beam 202, which is where the movement of the beam 202 is the largest, to the top mirror plate 102. The tether 208 also serves as a means for thermal decoupling the electrically conductive beam 202 from the mirror 102.

Figure 2A:
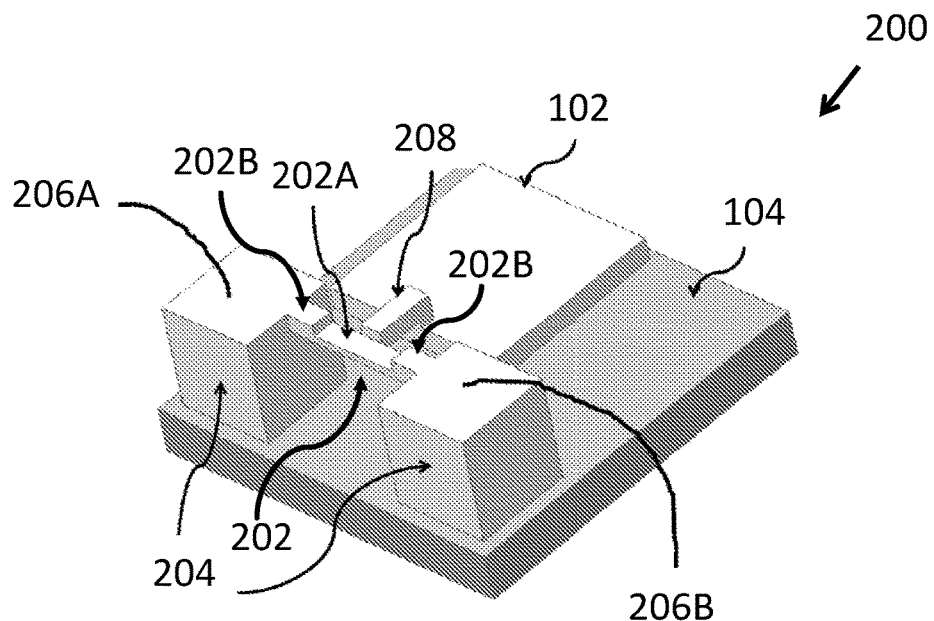
FIG. 2A is a perspective view of a notch beam up-down thermal actuator in an up position without applying voltage.
Figure 2B:
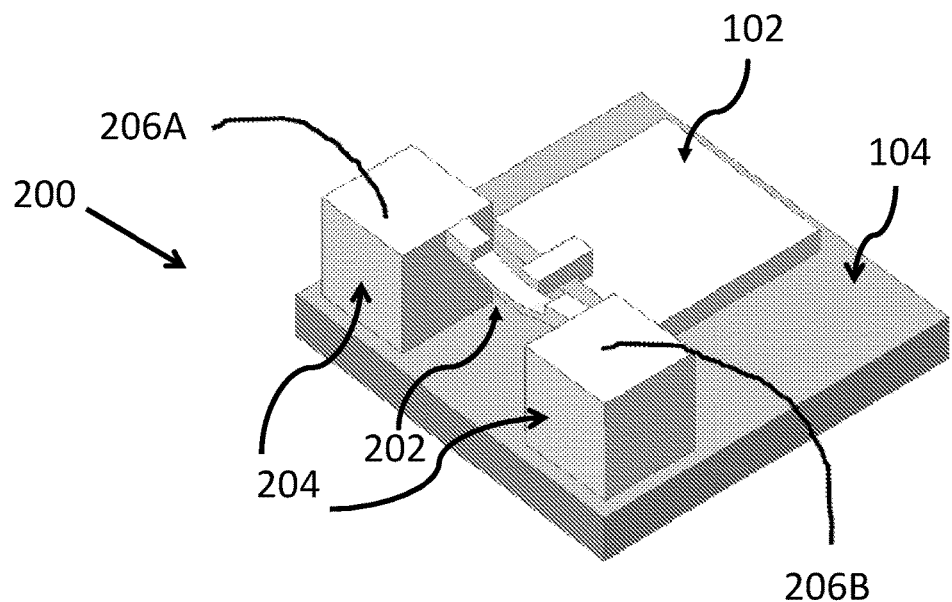
FIG. 2B is a perspective view of the actuator of FIG. 2A in a down position upon applying a voltage.
Figure 3A:
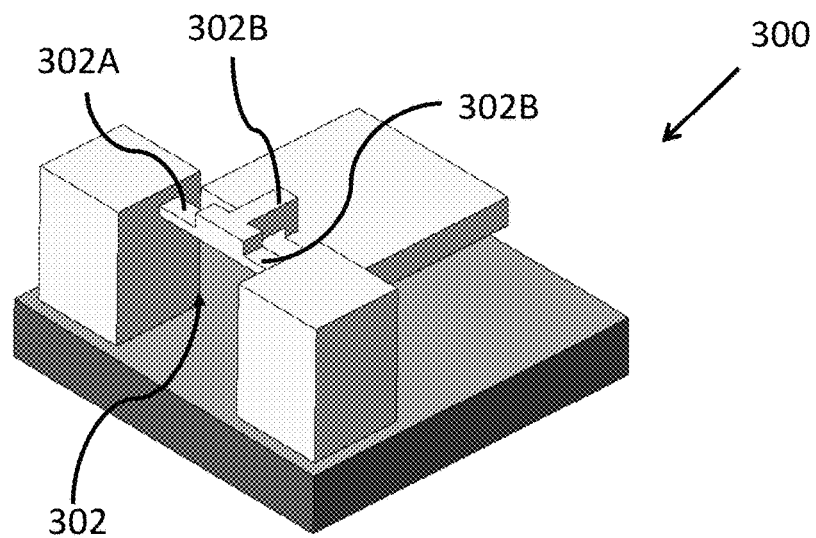
FIG. 3A is a perspective view of an embodiment of another notch beam up-down thermal actuator in a down position without applying voltage.
Figure 3B:
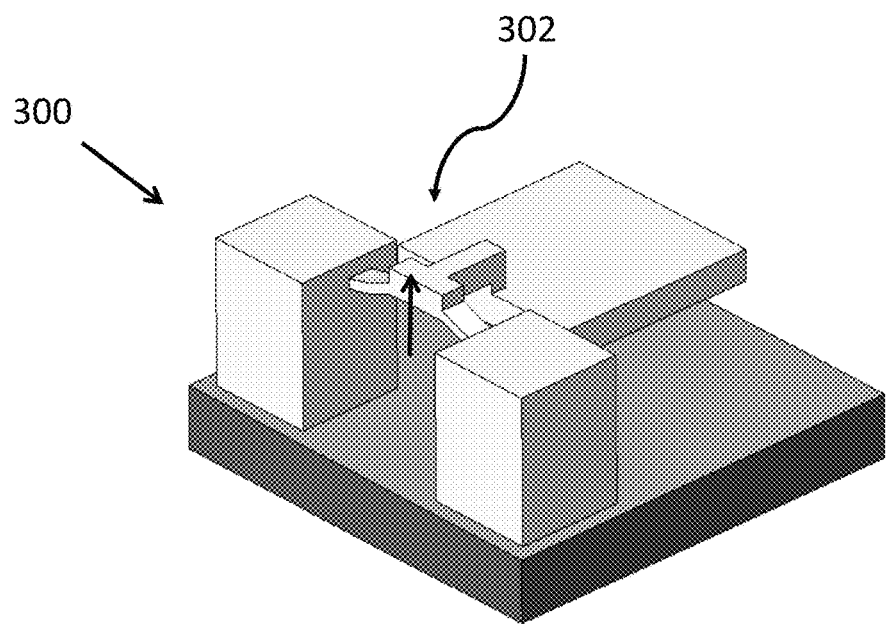
FIG. 3B is a perspective view of the actuator of FIG. 3A in an up position upon applying a voltage.

In operation, an electrical current is passed through the beam 202 via the two electrical wires 206A, 206B. Heat is mostly generated in the notched section 202A where the electrical resistance is higher than in the ends 202B. The current induced heat causes the beam 202 to expand. Due to the relatively flexibility in the notch area 202A and the clamping of the beam ends 202B to the substrate 104 through the posts 204, the beam 202 tends to bend downwards as shown in FIG. 2B. Because in this actuator configuration, the center 202A has the largest displacement, the thin bridge piece 208 is connected at the center 202A to move the top mirror 102. When the current is removed, the beam 202 returns to the original position as shown in FIG. 2A. Therefore, by connection of the mirror plate 102 through the bridge 208 to the actuation beam center 202A, as shown in FIG. 1, up and down motion by each actuator 200 enables the filter 100 to be tuned. The notch section 202A may also be formed in the opposite side (underside) of the actuation beam 202. A further embodiment of an actuator 300 is shown in FIGS. 3A, 3B in which the beam 302 is thinner or notched on the two ends 304 leaving the center section 302 thicker. In this configuration, movement of the beam 302 will be upward upon application of a voltage. The configuration of FIGS. 3A, 3B has an advantage of that the mirror 102 does not touch the substrate 104, especially when the gap between them is thin.

The elevated posts 204 also serve as a spacer in the cavity as well as provide thermal isolation for higher driving efficiency. The thermally induced molecular level expansion provides a much larger force than the conventional electrostatic force. Therefore, the disclosed actuator 200 is suitable for moving relatively large objects, such as a high quality optical mirror.

Embodiments of the present invention may be produced with a single etching processing step using silicon on isolator (SOI) wafer. The design is compact, allowing more devices to be fabricated on each wafer. The actuator does not need a hermetic package that is often the highest cost in a system that associated with electrostatic actuated MEMS devices.

Figure 4:
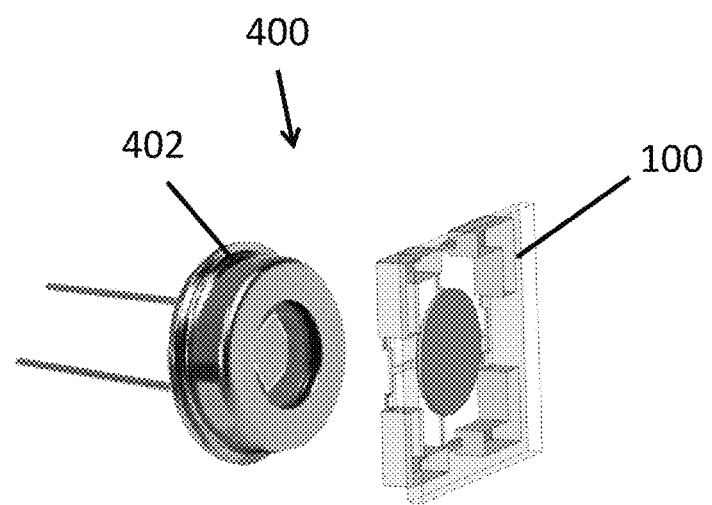
FIG. 4 is a perspective view of a notch beam thermal MEMS Fabry Perot tunable filter based spectrometer or hyper-imager, incorporating embodiments of the present invention.

FIG. 4 shows an embodiment of the filter 100 integrated into a spectrometer or hyper imager system 400. The system 400 couples and packages the inventive thermal tunable filter 100 with a detector 402, forming a high performance system of miniature size and low cost.

Figure 5:
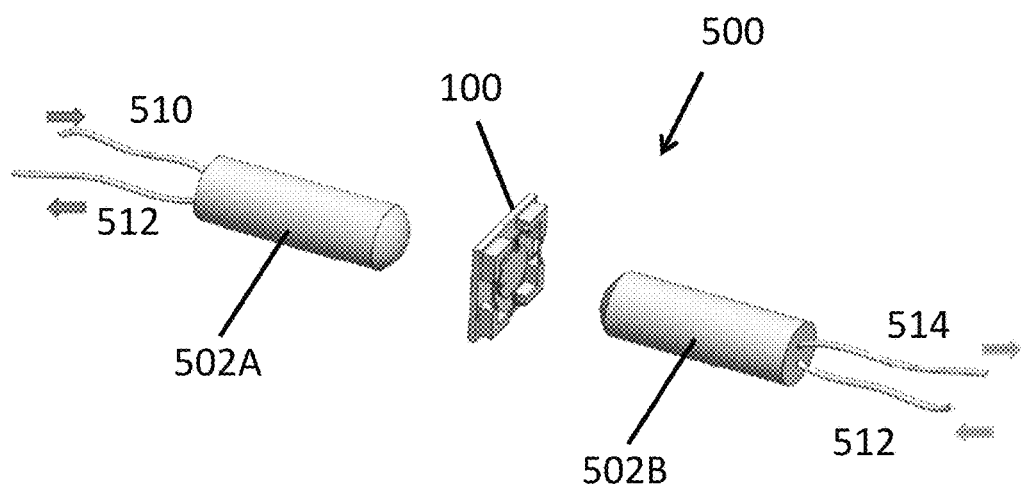
FIG. 5 is a perspective view of a notch beam thermal MEMS Fabry Perot tunable filter based fiber optical add/drop multiplexer, according to the present invention.

FIG. 5 illustrates an application in which the filter 100 of the present invention is incorporated into a wavelength division multiplexing (WDM) system 500. A pair of fiber optical collimators 502A, 502B are optically coupled with a thermal tunable filter 100 of the present invention in between. A main fiber consisting multiple signal channels enter through a first fiber 510, reflects from the optical mirror of the tunable filter 100, and enter the bypass fiber port 512, while the selected wavelength channel passes through the tunable filter 100 and enters into a signal drop fiber port 514. A return signal of a selected channel can also add to the main fiber line though fiber port 516. Therefore, any channel in the transmission line can be selectively dropped at a user terminal and a user signal may also be added to the fiber transmission at the same time, achieving dynamic WDM function in a miniature and low cost format. Moreover, embodiments of the Fabry-Perot filters 100 of the present invention have the capability for hitless tuning. During this operation, the top mirror 102 is intentionally tilted out of parallelism with respect to the substrate mirror while the top mirror 102 is adjusted to a desired cavity length. This is achieved by applying voltages to the four actuators 200 at different times so that the top mirror 102 is tilted during tuning. Once the top mirror 102 is tuned to the desired location, it is tilted back into parallelism with the substrate mirror. This functionality allows the filter 100 to tune from one location in the spectrum directly to another location without allowing other spectral channels in between to pass through.

While this invention has been particularly shown and described with references to preferred embodiments thereof, it will be understood by those skilled in the art that various changes in form and details may be made therein without departing from the scope of the invention encompassed by the appended claims.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:
1. A tunable etalon filter device, comprising:
a substrate mirror secured to a substrate and a top mirror forming an optical cavity therebetween;
at least two electrically conductive silicon beams, each comprising:
a center section, the entire center section having a first thickness;
two end sections separated by the center section, the entire thickness of each end section being a second thickness less than the first thickness, and an end of each end section being directly fixed to an elevated supporting post that is attached to the substrate; and
a bridge connecting the center section with the top mirror;
wherein each silicon beam and the connected top mirror moves in a direction perpendicular to the substrate upon passing an electrical current through the electrically conductive silicon beam.
2. The tunable etalon filter device of claim 1, wherein each end section is formed as a single notch in a top surface of the beam.
3. The tunable etalon filter device of claim 1, wherein the each end section is formed as a single notch in a bottom surface of the beam.
4. The tunable etalon filter device of claim 1, wherein the top mirror is made from a silicon on isolator wafer.
5. The tunable etalon filter device of claim 1, wherein the supporting posts comprise thermal isolation between the substrate and the electrically conductive silicon beam.
6. The tunable etalon filter device of claim 1, further comprising gold metal deposited on the supporting posts whereby current passes through the electrically conductive beams.

7. The tunable etalon filter device of claim 1, whereby the filter device is tunable by moving the top mirror with controlling voltages through the beams.

8. The tunable etalon filter device of claim 1, wherein bottom surfaces of the center section and the two end sections comprise a single continuous surface.

9. The tunable etalon filter device of claim 1, wherein top surfaces of the center section and the two end sections comprise a single continuous surface.

10. An optical spectrometer, comprising:
   a tunable etalon filter device, comprising:
      a substrate mirror secured to a substrate and a top mirror forming an optical cavity therebetween; and
      at least two electrically conductive silicon beams, each comprising:
         a center section, the entire center section having a first thickness;
         two end sections separated by the center section, the entire thickness of each end section being a second thickness less than the first thickness, and an end of each end section being directly fixed to an elevated supporting post that is attached to the substrate; and
         a bridge connecting the center section with the top mirror;
      wherein each silicon beam and the connected top mirror moves in a direction perpendicular to the substrate upon passing an electrical current through the electrically conductive silicon beam; and
   a photo detector optically coupled with the etalon tunable etalon filter device.

11. The optical spectrometer of claim 10, wherein each end section is formed as a single notch in a top surface of the beam.

12. The optical spectrometer of claim 10, wherein each end section is formed as a single notch in a bottom surface of the beam.

13. A fiber optical wavelength division multiplexer, comprising:
   two fiber collimators; and
   an tunable etalon filter device optically coupled between the two fiber collimators, the tunable etalon filter device comprising:
      a substrate mirror secured to a substrate and a top mirror forming an optical cavity therebetween; and
      at least two electrically conductive silicon beams, each comprising:
         a center section, the entire center section having a first thickness;
         two end sections separated by the center section, the entire thickness of each end section being a second thickness less than the first thickness, and an end of each end section being directly fixed to an elevated supporting post that is attached to the substrate; and
         a bridge connecting the center section with the top mirror;
      wherein each silicon beam and the connected top mirror moves in a direction perpendicular to the substrate upon passing an electrical current through the electrically conductive silicon beam.

14. The optical spectrometer of claim 13, wherein each end section is formed as a single notch in a top surface of the beam.

15. The optical spectrometer of claim 13, wherein each end section is formed as a single notch in a bottom surface of the beam.

* * * * *